US012566306B2

(12) United States Patent
Ferrara et al.

(10) Patent No.: US 12,566,306 B2
(45) Date of Patent: Mar. 3, 2026

(54) LIGHT DETECTION AND RANGING (LIDAR) SENSOR SYSTEM INCLUDING INTEGRATED CHIP

(71) Applicant: Aurora Operations, Inc., Mountain View, CA (US)

(72) Inventors: James Ferrara, Oakland, CA (US); Stefan Heinemann, Bozeman, MT (US); Pruthvi Jujjavarapu, Palo Alto, CA (US); Sen Lin, Mountain View, CA (US); Zhizhong Tang, Palo Alto, CA (US)

(73) Assignee: Aurora Operations, Inc, Pittsburgh, PA (US)

( * ) Notice: Subject to any disclaimer, the term of this patent is extended or adjusted under 35 U.S.C. 154(b) by 251 days.

(21) Appl. No.: 18/359,127

(22) Filed: Jul. 26, 2023

(65) Prior Publication Data

US 2025/0035869 A1     Jan. 30, 2025

(51) Int. Cl.
*G02B 6/42*          (2006.01)
*G01S 17/931*       (2020.01)

(52) U.S. Cl.
CPC .......... *G02B 6/4279* (2013.01); *G01S 17/931* (2020.01); *G02B 6/4251* (2013.01); *G02B*

6/426 (2013.01); *G02B 6/4277* (2013.01); *G02B 6/4295* (2013.01)

(58) Field of Classification Search
CPC .... G02B 6/4214; G01S 7/4814; G01S 7/4816
See application file for complete search history.

(56) References Cited

U.S. PATENT DOCUMENTS

| | | | |
|---|---|---|---|
| 11,860,308 B1 * | 1/2024 | Delaney | H05K 7/20509 |
| 2002/0136505 A1 * | 9/2002 | Goldberg | H01S 3/06704 |
| | | | 385/94 |
| 2018/0115035 A1 * | 4/2018 | Brannon | H01P 7/04 |
| 2024/0027706 A1 * | 1/2024 | Tadayon | G02B 6/4214 |

* cited by examiner

*Primary Examiner* — Eric Wong
(74) *Attorney, Agent, or Firm* — Patent Law Works LLP

(57) ABSTRACT

Manufacturing an integrated chip packaging for a LIDAR sensor mounted to a vehicle includes obtaining a metallic housing including a cutout on a side of the metallic housing, obtaining a ceramic radio frequency (RF) circuit board including a flange, coupling the flange of the ceramic RF circuit board to the cutout on the side of the metallic housing, applying a sealing material to an interface between the flange of the ceramic RF circuit board and the cutout on the side of the metallic housing, and locally heating the flange of the ceramic RF circuit board to bond the flange of the ceramic RF circuit board to the cutout on the side of the metallic housing thereby forming a seal at the interface.

19 Claims, 8 Drawing Sheets

LIGHT DETECTION AND RANGING (LIDAR) SENSOR SYSTEM INCLUDING INTEGRATED CHIP

TECHNICAL FIELD

The present disclosure pertains generally to integrated chip packaging for a light detection and ranging (LIDAR) sensor system, and more specifically to hermetically sealing a radio frequency circuit board in the integrated chip packaging for LIDAR sensors in autonomous vehicle technology.

BACKGROUND

LIDAR sensor systems are used for a variety of applications, from altimetry, to imaging, to collision avoidance. The design and implementation of a LIDAR sensor system may use a photonic integrated circuit (PIC) or integrated optical circuit which is a chip that contains photonic components. However, there is a need for a chip-scale package solution to provide a hermetic seal to the photonic components while facilitating a scaling up of beam counts in LIDAR sensor systems test.

SUMMARY

Implementations of the present disclosure relate to packaging one or more optical and electronic components for a light detection and ranging (LIDAR) sensor system, and more particularly to a system and method for decoupling a radio frequency (RF) circuit board from the integrated chip packaging for the LIDAR sensor system in a vehicle (e.g., autonomous vehicles) and hermetically sealing the RF circuit board in the integrated chip packaging for the LIDAR sensor system. The integrated chip packaging for the LIDAR sensor system may include a configuration of optical and electronic components. In one example, the optical and electronic components may include optoelectronic components and integrated silicon photonic chips.

In some implementations of the present disclosure, a method for manufacturing an integrated chip packaging for a LIDAR sensor mounted to a vehicle includes obtaining a metallic housing including a cutout on a side of the metallic housing, obtaining a ceramic radio frequency (RF) circuit board including a flange, coupling the flange of the ceramic RF circuit board to the cutout on the side of the metallic housing, applying a sealing material to an interface between the flange of the ceramic RF circuit board and the cutout on the side of the metallic housing, and locally heating the flange of the ceramic RF circuit board to bond the flange of the ceramic RF circuit board to the cutout on the side of the metallic housing thereby forming a seal at the interface. The method further includes coupling the flange of the ceramic RF circuit board to the cutout on the side of the metallic housing by inserting, using a jig, the ceramic RF circuit board into the cutout on the side of the metallic housing and aligning, using the jig, the flange of the ceramic RF circuit board against the cutout on the side of the metallic housing. The method further includes aligning the flange of the ceramic RF circuit board against the cutout on the side of the metallic housing by aligning bond pads between the ceramic RF circuit board and a direct current (DC) circuit board within the metallic housing and wire bonding the bond pads for making an interconnection. The method further includes applying the sealing material to the interface between the flange of the ceramic RF circuit board and the cutout on the side of the metallic housing by dispensing the sealing material onto a surface of the flange of the ceramic RF circuit board prior to the coupling and applying pressure, using the jig, to ensure contact is made at the interface between the flange of the ceramic RF circuit board and the cutout on the side of the metallic housing. The method further includes coupling a lid to the metallic housing prior to locally heating the flange of the ceramic RF circuit board. The method further includes locally heating the flange of the ceramic RF circuit board to bond the flange of the ceramic RF circuit board to the cutout on the side of the metallic housing by raising, using the resistive heater, a temperature of the flange to sinter the sealing material and measuring, using the thermocouple, the temperature of the flange as the resistive heater raises the temperature to reach a threshold temperature associated with sintering.

In some implementations, the present disclosure describes an integrated chip packaging for a LIDAR sensor manufactured by the method as described herein. In some implementations, the present disclosure describes a LIDAR sensor system including an integrated chip packaging for a LIDAR sensor manufactured by the method as described herein. These and other implementations may each optionally include one or more of the following aspects. For instance, the aspects may include the seal at the interface being a hermetic seal and the hermetic seal shielding RF signals on the ceramic radio frequency (RF) circuit board within the metallic housing from electromagnetic interference. For instance, the aspects may further include the interconnection including one between a transimpedance amplifier (TIA) bank on the ceramic RF circuit board and a transceiver assembly on the DC circuit board within the metallic housing. For instance, the aspects may further include the lid covering an open side of the metallic housing and a side of the lid overlapping the flange of the ceramic RF circuit board such that the lid contacts the sealing material. For instance, the aspects may further include locally heating the flange of the ceramic RF circuit board bonding the lid to the metallic housing and the flange of the ceramic RF circuit board. For instance, the aspects may further include the flange of the ceramic RF circuit board including an embedding of a resistive heater and a thermocouple, the temperature of the flange being raised to a point anywhere in a range from 200 to 250 degree Celsius, a base of the ceramic RF circuit board being provisioned with a supporting structure for minimizing shock and vibration, the ceramic RF circuit board being assembled with one or more of a RF connector, a transimpedance amplifier (TIA) bank, RF amplifiers, and RF filters, the DC circuit board within the metallic housing being assembled with one or more of a seed laser assembly, an optical amplifier assembly, a transceiver assembly, a lens array, and a heat transfer component, the sealing material comprising at least one of silver sinter or solder, and the ceramic RF circuit board being a multilayer ceramic RF circuit board.

Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings. Moreover, the language used in the present disclosure has been principally selected for readability and instructional purposes, and not to limit the scope of the subject matter disclosed herein.

BRIEF DESCRIPTION OF THE DRAWINGS

Implementations are illustrated by way of example, and not by way of limitation, in the figures of the accompanying drawings in which like reference numerals refer to similar elements and in which.

Figure 1A:
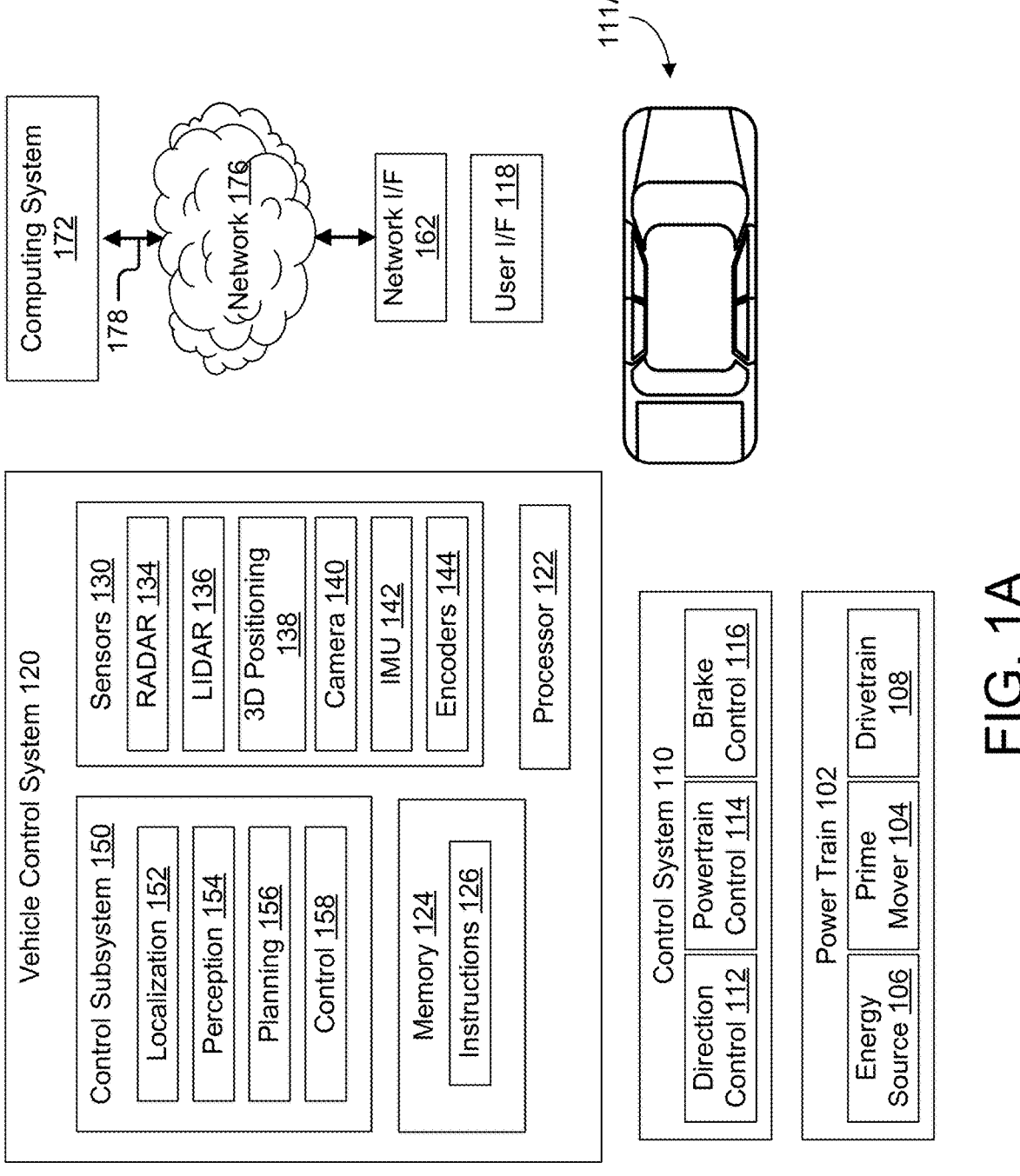
FIG. 1A is a block diagram illustrating an example of a system environment for an autonomous vehicle according to some implementations.

It should be understood that alternative implementations of the structures and methods illustrated herein may be employed without departing from the principles described herein.

DETAILED DESCRIPTION

According to certain aspects, manufacturing an integrated chip packaging for a LIDAR sensor mounted to a vehicle may include obtaining a metallic housing including a cutout on a side of the metallic housing, obtaining a ceramic radio frequency (RF) circuit board including a flange, coupling the flange of the ceramic RF circuit board to the cutout on the side of the metallic housing, applying a sealing material to an interface between the flange of the ceramic RF circuit board and the cutout on the side of the metallic housing, and locally heating the flange of the ceramic RF circuit board to bond the flange of the ceramic RF circuit board to the cutout on the side of the metallic housing thereby forming a seal at the interface. In one example, the seal at the interface is a low temperature ceramic-to-metal hermetic seal. In another example, the sealing material may include solder, silver sinter, etc. In another example, the metallic housing may be made from a composite assembly of kovar, copper, tungsten, and ceramic material. The metallic housing may include a base, a frame or body, and a lid.

In the following description, for purposes of explanation, numerous specific details are set forth to provide a thorough understanding of the various aspects of different example implementations. Note that any particular example implementation may in various cases be practiced without all of the specific details and/or with variations, permutations, and combinations of the various features and elements described herein. Reference will now be made in detail to the implementations of the present disclosure, examples of which are illustrated in the accompanying drawings. Wherever possible, the same reference numbers are used in the drawings and the description to refer to the same or like parts.

Furthermore, relative terms, such as "lower" or "bottom" or "back" or "below" and "upper" or "top" or "front" or "above" may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The example term "lower" can, therefore, encompass both an orientation of "lower" and "upper," depending upon the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Referring to the drawings, wherein like numbers denote like parts throughout the several views, FIG. 1A illustrates an example of a system environment 100A for an autonomous vehicle 111A within which various techniques disclosed herein may be implemented. The vehicle 111A, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 111A may be implemented as any number of different types of vehicles, including vehicles capable of transporting people and/or cargo, and capable of traveling by land and it should be appreciated that the aforementioned components 102-116 may vary widely based upon the type of vehicle within which these components are utilized.

For simplicity, the implementations discussed hereinafter focus on a wheeled land vehicle such as a car, van, truck, bus, etc. In such implementations, the prime mover 104 may include one or more electric motors and/or an internal combustion engine (among others). The energy source 106 may include, for example, a fuel system (e.g., providing gasoline, diesel, hydrogen, etc.), a battery system, solar panels, or other renewable energy source, and/or a fuel cell system. The drivetrain 108 includes wheels and/or tires along with a transmission and/or any other mechanical drive components suitable for converting the output of the prime mover 104 into vehicular motion, as well as one or more brakes configured to controllably stop or slow the vehicle 111A and direction or steering components suitable for controlling the trajectory of the vehicle 111A (e.g., a rack and pinion steering linkage enabling one or more wheels of the vehicle 111A to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in other implementations, multiple electric motors (e.g., dedicated to individual wheels or axles) may be used as a prime mover 104. In the case of a hydrogen fuel cell implementation, the prime mover 104 may include one or more electric motors and the energy source 106 may include a fuel cell system powered by hydrogen fuel.

The direction control 112 may include one or more actuators and/or sensors for controlling and receiving feedback from the direction or steering components to enable the vehicle 111A to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 111A. The brake control 116 may be configured to control one or more brakes that slow or stop vehicle 111A, e.g., disk or drum brakes coupled to the wheels of the vehicle.

Other vehicle types, including, but not limited to, all-terrain or tracked vehicles, and construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, various levels of autonomous control including full or semi-autonomous control over the vehicle 111A can be implemented in a vehicle control system 120, which may include one or more processors 122 and one or more memories 124, with each processor 122 configured to execute program code instructions 126 stored in a memory 124. The processor(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle 111A. For example, sensors 130 can include one or more detection and ranging sensors (e.g., a RADAR sensor 134, a LIDAR sensor 136, or both), a 3D positioning sensor 138, e.g., a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can optionally include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle 111A in three directions. One or more encoders 144, such as wheel encoders may be used to monitor the rotation of one or more wheels of vehicle 111A. In some implementations, the LIDAR sensor 136 may include a structure of the silicon photonics device for the coherent LIDAR system as described in detail below.

The outputs of sensors 130 may be provided to a set of control subsystems 150, including a localization subsystem 152, a perception subsystem 154, a planning subsystem 156, and a control subsystem 158. The localization subsystem 152 is principally responsible for precisely determining the location and orientation (also sometimes referred to as "pose" or "pose estimation") of the vehicle 111A within its surrounding environment, and generally within some frame of reference. The perception subsystem 154 is principally responsible for detecting, tracking, and/or identifying objects within the environment surrounding the vehicle

111A. A machine learning model in accordance with some implementations can be utilized in tracking objects. The planning subsystem 156 is principally responsible for planning a trajectory or a path of motion for vehicle 111A over some timeframe given a desired destination as well as the static and moving objects within the environment. A machine learning model in accordance with some implementations can be utilized in planning a vehicle trajectory. The control subsystem 158 is principally responsible for generating suitable control signals for controlling the various controls in the vehicle control system 120 in order to implement the planned trajectory of the vehicle 111A. Similarly, a machine learning model can be utilized to generate one or more signals to control the autonomous vehicle 111A to implement the planned trajectory.

It will be appreciated that the collection of components illustrated in FIG. 1A for the vehicle control system 120 is merely one example. Individual sensors may be omitted in some implementations. Additionally, or alternatively, in some implementations, multiple sensors of the same types illustrated in FIG. 1A may be used for redundancy and/or to cover different regions around a vehicle. Moreover, there may be additional sensors of other types beyond those described above to provide actual sensor data related to the operation and environment of the wheeled land vehicle. Likewise, different types and/or combinations of control subsystems may be used in other implementations. Further, while subsystems 152-158 are illustrated as being separate from processor 122 and memory 124, it should be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 111A may also include a secondary vehicle control system (not illustrated), which may be used as a redundant or backup control system for the vehicle 111A. In some implementations, the secondary vehicle control system may be capable of fully operating the autonomous vehicle 111A in the event of an adverse event in the vehicle control system 120, while in other implementations, the secondary vehicle control system may only have limited functionality, e.g., to perform a controlled stop of the vehicle 111A in response to an adverse event detected in the primary vehicle control system 120. In still other implementations, the secondary vehicle control system may be omitted.

In general, different architectures, including various combinations of software, hardware, circuit logic, sensors, networks, etc. may be used to implement the various components illustrated in FIG. 1A. Each processor may be implemented, for example, as a microprocessor and each memory may represent the random-access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 111A, e.g., any cache memory in a processor, as well as any storage capacity used as a virtual memory, e.g., as stored on a mass storage device or another computer controller. One or more processors 122 illustrated in FIG. 1A, or entirely separate processors, may be used to implement additional functionality in the vehicle 111A outside of the purposes of autonomous control, e.g., to control entertainment systems, to operate doors, lights, convenience features, etc.

In addition, for additional storage, the vehicle 111A may include one or more mass storage devices, e.g., a removable disk drive, a hard disk drive, a direct access storage device ("DASD"), an optical drive (e.g., a CD drive, a DVD drive, etc.), a solid-state storage drive ("SSD"), network attached storage, a storage area network, and/or a tape drive, among others.

Furthermore, the vehicle 111A may include a user interface 118 to enable vehicle 111A to receive a number of inputs from and generate outputs for a user or operator, e.g., one or more displays, touchscreens, voice and/or gesture interfaces, buttons, and other tactile controls, etc. Otherwise, user input may be received via another computer or electronic device, e.g., via an app on a mobile device or via a web interface.

Moreover, the vehicle 111A may include one or more network interfaces, e.g., network interface 162, suitable for communicating with one or more networks 176 to permit the communication of information with other computers and electronic devices, including, for example, a central service, such as a cloud service, from which the vehicle 111A receives information including trained machine learning models and other data for use in autonomous control thereof. The one or more networks 176, for example, may be a communication network and include a wide area network ("WAN") such as the Internet, one or more local area networks ("LANs") such as Wi-Fi LANs, mesh networks, etc., and one or more bus subsystems. The one or more networks 176 may optionally utilize one or more standard communication technologies, protocols, and/or inter-process communication techniques. In some implementations, data collected by the one or more sensors 130 can be uploaded to a computing system 172 via the network 176 for additional processing. In the illustrated implementation, the vehicle 111A may communicate via the network 176 and signal line 178 with a computing system 172. In some implementations, the computing system 172 is a cloud-based computing device. Additionally, processing of autonomous vehicle data by computing system 172 in accordance with many implementations is described with respect to FIG. 2.

Each processor illustrated in FIG. 1A, as well as various additional controllers and subsystems disclosed herein, generally operates under the control of an operating system, and executes or otherwise relies upon various computer software applications, components, programs, objects, modules, data structures, etc., as described in greater detail below. Moreover, various applications, components, programs, objects, modules, etc. may also execute on one or more processors in another computer (e.g., computing system 172) coupled to vehicle 111A via network 176, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module, or sequence of instructions, or even a subset thereof, are referred to herein as "program code." Program code typically comprises one or more instructions that are resident at various times in various memory and storage devices, and that, when read and executed by one or more processors, perform the steps necessary to execute steps or elements embodying the various aspects of the present disclosure. Moreover, while implementations have and hereinafter are described in the context of fully functioning computers and systems, it should be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The example environment illustrated in FIG. 1A is not intended to limit implementations disclosed herein. Indeed, other alternative hardware and/or software environments may be used without departing from the scope of implementations disclosed herein.

Figure 2:
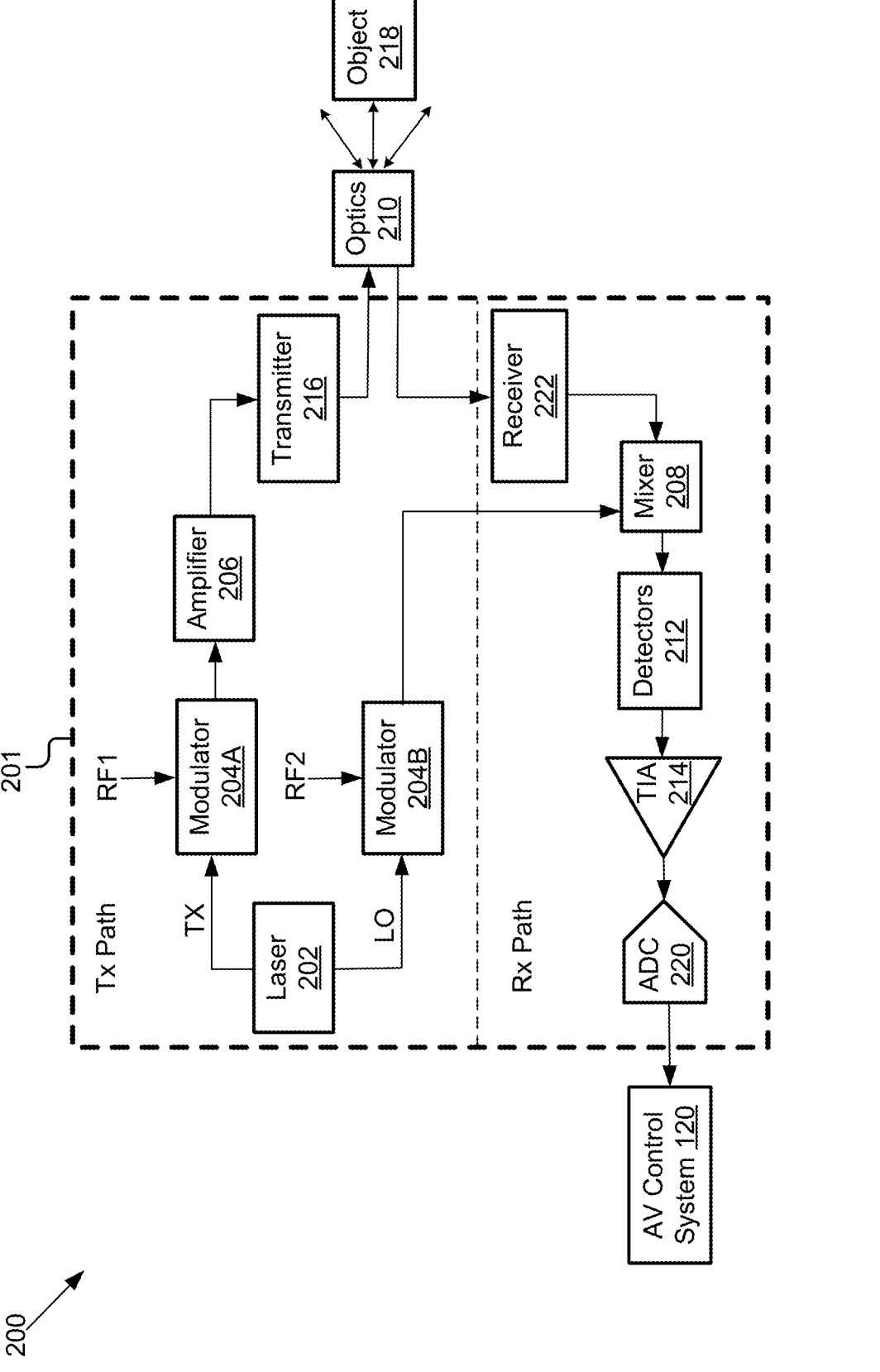
FIG. 2 is a block diagram illustrating an example of a LIDAR sensor system for autonomous vehicles, according to some implementations.

A truck can include a LIDAR system (e.g., vehicle control system 120 in FIG. 1A, LIDAR sensor system 201 in FIG. 2, etc.). In some implementations, the LIDAR system can use frequency modulation to encode an optical signal and scatter the encoded optical signal into free space using optics. By detecting the frequency differences between the encoded optical signal and a returned signal reflected back from an object, the frequency modulated (FM) LIDAR system can determine the location of the object and/or precisely measure the velocity of the object using the Doppler effect. An FM LIDAR system may use a continuous wave (referred to as, "FMCW LIDAR" or "coherent FMCW LIDAR") or a quasi-continuous wave (referred to as, "FMQW LIDAR"). The LIDAR system can use phase modulation (PM) to encode an optical signal and scatter the encoded optical signal into free space using optics.

An FM or phase-modulated (PM) LIDAR system may provide substantial advantages over conventional LIDAR systems with respect to automotive and/or commercial trucking applications. To begin, in some instances, an object (e.g., a pedestrian wearing dark clothing) may have a low reflectivity, in that it only reflects back to the sensors (e.g., sensors 130 in FIG. 1A) of the FM or PM LIDAR system a low amount (e.g., 10% or less) of the light that hits the object. In other instances, an object (e.g., a shiny road sign)

may have a high reflectivity (e.g., above 10%), in that it reflects back to the sensors of the FM LIDAR system a high amount of the light that hits the object.

Regardless of the object's reflectivity, an FM LIDAR system may be able to detect (e.g., classify, recognize, discover, etc.) the object at greater distances (e.g., 2×) than a conventional LIDAR system. For example, an FM LIDAR system may detect a low reflectivity object beyond 300 meters, and a high reflectivity object beyond 400 meters.

To achieve such improvements in detection capability, the FM LIDAR system may use sensors (e.g., sensors 130 in FIG. 1A). In some implementations, these sensors can be single photon sensitive, meaning that they can detect the smallest amount of light possible. While an FM LIDAR system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR system in infrared wavelengths, the FM or PM LIDAR system can broadcast stronger light pulses or light beams while meeting eye safety standards. Conventional LIDAR systems are often not single photon sensitive and/or only operate in near infrared wavelengths, requiring them to limit their light output (and distance detection capability) for eye safety reasons.

Thus, by detecting an object at greater distances, an FM LIDAR system may have more time to react to unexpected obstacles. Indeed, even a few milliseconds of extra time could improve safety and comfort, especially with heavy vehicles (e.g., commercial trucking vehicles) that are driving at highway speeds.

Another advantage of an FM LIDAR system is that it provides accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in PMCW or FMCW LIDAR systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR system to determine distant or sparse data points as objects and/or track how those objects are moving over time. For example, an FM LIDAR sensor (e.g., sensors 130 in FIG. 1A) may only receive a few returns (e.g., hits) on an object that is 300 m away, but if those return give a velocity value of interest (e.g., moving towards the vehicle at >70 mph), then the FM LIDAR system and/or the autonomous vehicle control system may determine respective weights to probabilities associated with the objects.

Faster identification and/or tracking of the FM LIDAR system gives an autonomous vehicle control system more time to maneuver a vehicle. A better understanding of how fast objects are moving also allows the autonomous vehicle control system to plan a better reaction.

Another advantage of an FM LIDAR system is that it is less static compared to conventional LIDAR systems. That is, the conventional LIDAR systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR systems often need extra hardware, complex software, and/or more computational power to manage this "noise."

In contrast, FM LIDAR systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR systems produce (e.g., generates, derives, etc.) more accurate data with less hardware or software requirements, enabling safer and smoother driving.

Lastly, an FM LIDAR system is easier to scale than conventional LIDAR systems. As more self-driving vehicles (e.g., cars, commercial trucks, etc.) show up on the road, those powered by an FM LIDAR system likely will not have to contend with interference issues from sensor crosstalk. Furthermore, an FM LIDAR system uses less optical peak power than conventional LIDAR sensors. As such, some, or all of the optical components for an FM LIDAR can be produced on a single chip, which produces its own benefits, as discussed herein.

Figure 1B:
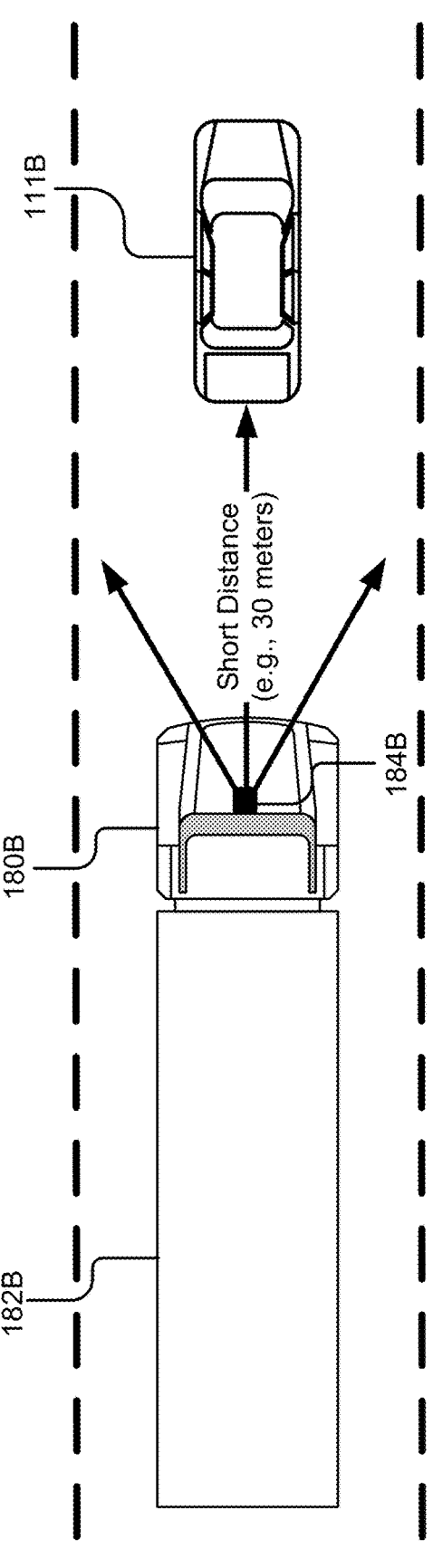
FIG. 1B is a block diagram illustrating an example of a system environment for autonomous commercial trucking vehicles, according to some implementations.

FIG. 1B is a block diagram illustrating an example of a system environment for autonomous commercial trucking vehicles, according to some implementations. The environment 100B includes a commercial truck 180B for hauling cargo 182B. In some implementations, the commercial truck 180B may include vehicles configured to long-haul freight transport, regional freight transport, intermodal freight transport (i.e., in which a road-based vehicle is used as one of multiple modes of transportation to move freight), and/or any other road-based freight transport applications. The commercial truck 180B may be a flatbed truck, a refrigerated truck (e.g., a reefer truck), a vented van (e.g., dry van), a moving truck, etc. The cargo 182B may be goods and/or produce. The commercial truck 180B may include a trailer to carry the cargo 182B, such as a flatbed trailer, a lowboy trailer, a step deck trailer, an extendable flatbed trailer, a side kit trailer, etc.

The environment 100B includes an object 111B (shown in FIG. 1B as another vehicle) that is within a distance range that is equal to or less than 30 meters from the truck.

The commercial truck 180B may include a LIDAR system 184B (e.g., an FM LIDAR system, vehicle control system 120 in FIG. 1A, LIDAR sensor system 201 in FIG. 2, etc.) for determining a distance to the object 111B and/or measuring the velocity of the object 111B. Although FIG. 1B shows that one LIDAR system 184B is mounted on the front of the commercial truck 180B, the number of LIDAR systems and the mounting area of the LIDAR systems on the commercial truck are not limited to a particular number or a particular area. The commercial truck 180B may include any number of LIDAR systems 184B (or components thereof, such as sensors, modulators, coherent signal generators, etc.) that are mounted onto any area (e.g., front, back, side, top, bottom, underneath, and/or bottom) of the commercial truck 180B to facilitate the detection of an object in any free-space relative to the commercial truck 180B.

As shown in FIG. 1B, the LIDAR system 184B in environment 100B may be configured to detect an object (e.g., another vehicle, a bicycle, a tree, street signs, potholes, etc.) at short distances (e.g., 30 meters or less) from the commercial truck 180B.

Figure 1C:
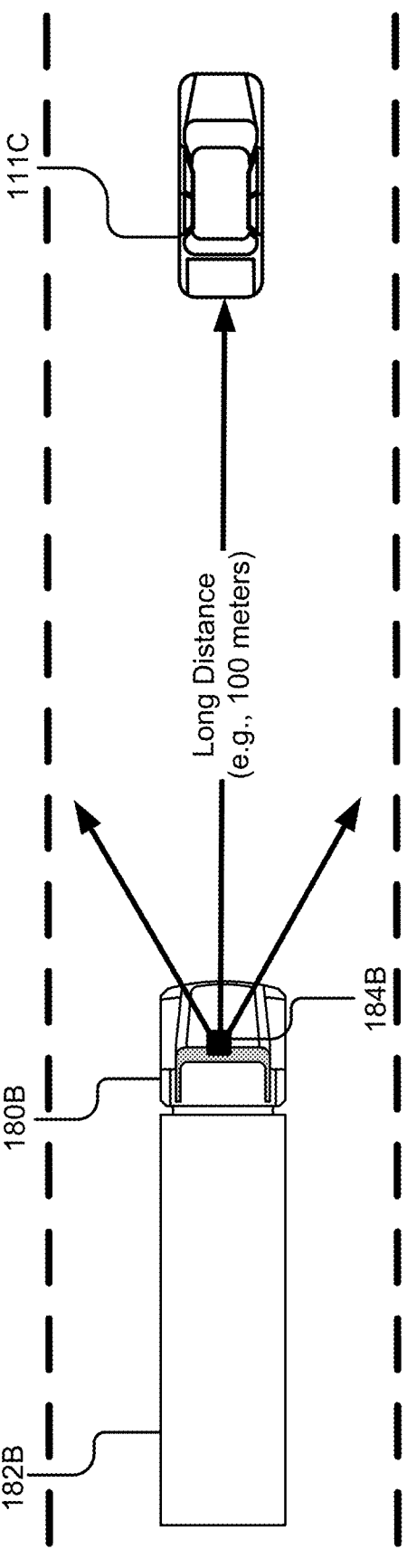
FIG. 1C is a block diagram illustrating an example of a system environment for autonomous commercial trucking vehicles, according to some implementations.

FIG. 1C is a block diagram illustrating an example of a system environment for autonomous commercial trucking vehicles, according to some implementations. The environment 100C includes the same components (e.g., commercial truck 180B, cargo 182B, LIDAR system 184B, etc.) that are included in environment 100B.

The environment 100C includes an object 111C (shown in FIG. 1C as another vehicle) that is within a distance range that is (i) more than 30 meters and (ii) equal to or less than 150 meters from the commercial truck 180B. As shown in FIG. 1C, the LIDAR system 184B in environment 100C may be configured to detect an object (e.g., another vehicle, a bicycle, a tree, street signs, potholes, etc.) at a distance (e.g., 100 meters) from the commercial truck 180B.

Figure 1D:
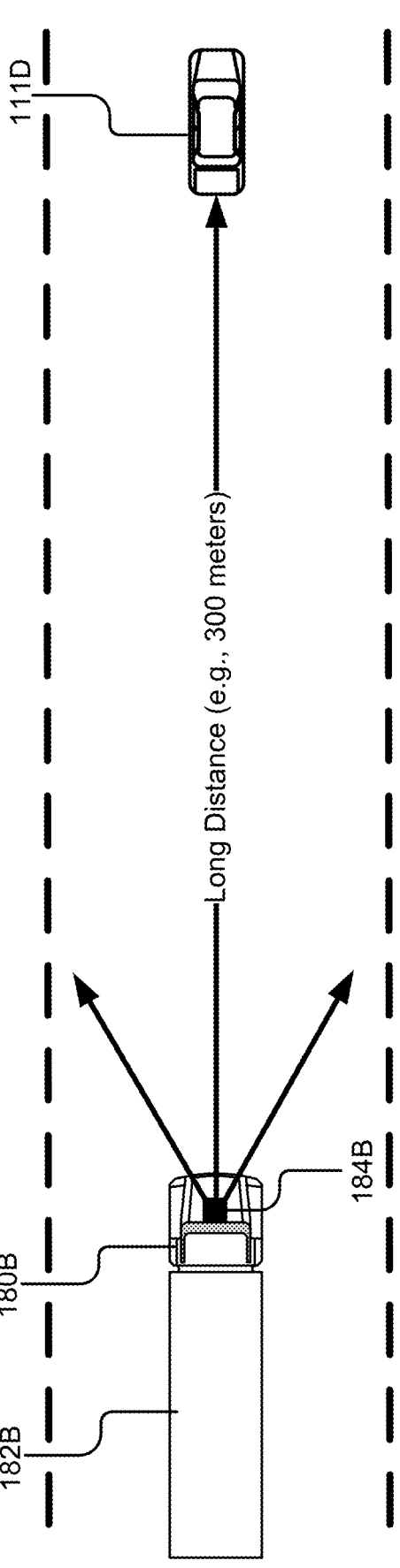
FIG. 1D is a block diagram illustrating an example of a system environment for autonomous commercial trucking vehicles, according to some implementations.

FIG. 1D is a block diagram illustrating an example of a system environment for autonomous commercial trucking vehicles, according to some implementations. The environment 100D includes the same components (e.g., commercial truck 180B, cargo 182B, LIDAR system 184B, etc.) that are included in environment 100B.

The environment 100D includes an object 111D (shown in FIG. 1D as another vehicle) that is within a distance range that is more than 150 meters from the commercial truck 180B. As shown in FIG. 1D, the LIDAR system 184B in environment 100D may be configured to detect an object (e.g., another vehicle, a bicycle, a tree, street signs, potholes, etc.) at a distance (e.g., 300 meters) from the commercial truck 180B.

In commercial trucking applications, it is important to effectively detect objects at all ranges due to the increased weight and, accordingly, longer stopping distance required for such vehicles. FM LIDAR systems (e.g., FMCW and/or FMQW systems) or PM LIDAR systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM LIDAR systems can be used in semi-autonomous applications, in which the commercial truck has a driver and some functions of the commercial truck are autonomously operated using the FM or PM LIDAR system, or fully autonomous applications, in which the commercial truck is operated entirely by the FM or LIDAR system, alone or in combination with other vehicle systems.

In a LIDAR system that uses CW modulation, the modulator modulates the laser light continuously. For example, if a modulation cycle is 10 seconds, an input signal is modulated throughout the whole 10 seconds. Instead, in a LIDAR system that uses quasi-CW modulation, the modulator modulates the laser light to have both an active portion and an inactive portion. For example, for a 10 second cycle, the modulator modulates the laser light only for 8 seconds (sometimes referred to as, "the active portion"), but does not modulate the laser light for 2 seconds (sometimes referred to as, "the inactive portion"). By doing this, the LIDAR system may be able to reduce power consumption for the 2 seconds because the modulator does not have to provide a continuous signal.

In Frequency Modulated Continuous Wave (FMCW) LIDAR for automotive applications, it may be beneficial to operate the LIDAR system using quasi-CW modulation where FMCW measurement and signal processing methodologies are used, but the light signal is not in the on-state (e.g., enabled, powered, transmitting, etc.) all the time. In some implementations, Quasi-CW modulation can have a duty cycle that is equal to or greater than 1% and up to 50%. If the energy in the off-state (e.g., disabled, powered-down, etc.) can be expended during the actual measurement time then there may be a boost to signal-to-noise ratio (SNR) and/or a reduction in signal processing requirements to coherently integrate all the energy in the longer time scale.

FIG. 2 is a block diagram illustrating an example environment of a LIDAR sensor system for autonomous vehicles, according to some implementations. The environment 200 includes a LIDAR sensor system 201 that includes a transmit (Tx) path and a receive (Rx) path. The Tx path includes one or more Tx input/output ports (not shown in FIG. 2), and the Rx path includes one or more Rx input/output ports (not shown in FIG. 2).

In some implementations, a semiconductor substrate and/or semiconductor package may include the Tx path and the Rx path. In some implementations, the semiconductor substrate and/or semiconductor package may include at least one of silicon photonics circuitry, programmable logic controller (PLC), or III-V semiconductor circuitry.

In some implementations, a first semiconductor substrate and/or a first semiconductor package may include the Tx path and a second semiconductor substrate and/or a second semiconductor package may include the Rx path. In some implementations, the Rx input/output ports and/or the Tx input/output ports may occur (or be formed/disposed/located/placed) along one or more edges of one or more semiconductor substrates and/or semiconductor packages.

The environment 200 includes one or more transmitters 216 and one or more receivers 222.

The environment 200 includes one or more optics 210 (e.g., an oscillatory scanner, a unidirectional scanner, a Risley prism, a circulator optic, and/or a beam collimator, etc.) that are coupled to the LIDAR sensor system 201. In some implementations, the one or more optics 210 may be coupled to the Tx path via the one or more Tx input/output ports. In some implementations, the one or more optics 210 may be coupled to the Rx path via the one or more Rx input/output ports.

The environment 200 includes an autonomous vehicle control system 120 (e.g., vehicle control system 120 in FIG. 1A) that is coupled to the LIDAR sensor system 201. In some implementations, the vehicle control system 120 may be coupled to the Rx path via the one or more Rx input/output ports.

The Tx path may include a laser source 202, a modulator 204A, a modulator 204B, an amplifier 206, and one or more transmitters 216. The Rx path may include one or more receivers 222, a mixer 208, a detector 212, a transimpedance amplifier (TIA) 214, and one or more analog-to-digital converters (ADCs). Although FIG. 2 shows only a select number of components and only one input/output channel; the environment 200 may include any number of components and/or input/output channels (in any combination) that are interconnected in any arrangement to facilitate combining multiple functions of a LIDAR system, to support the operation of a vehicle.

The laser source 202 may be configured to generate a light signal (or beam) that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1440 nanometers.

The laser source 202 may be configured to provide the light signal (e.g., TX signal) to the modulator 204A, which is configured to modulate a phase and/or a frequency of the light signal based on a first radio frequency (RF) signal (shown in FIG. 2 as, "RF1") and using Continuous Wave (CW) modulation or quasi-CW modulation to generate a modulated light signal. The modulator 204A may be configured to send the modulated light signal to the amplifier 206. The amplifier 206 may be configured to amplify the modulated light signal to generate an amplified light signal that is provided to the optics 210 via the one or more transmitters 216. The one or more transmitters 216 may include one or more optical waveguides or antennas.

The optics 210 may be configured to steer the amplified light signal that it receives from the Tx path into an environment within a given field of view toward an object 218, may receive a returned signal reflected back from the object 218, and provide the returned signal to the mixer 208 of the Rx path via the one or more receivers 222. The one or more receivers 222 may include one or more optical waveguides or antennas. In some arrangements, the transmitters 216 and the receivers 222 may constitute one or more transceivers (not shown in FIG. 2). In some arrangements, the one or more transceivers may include a monostatic transceiver or a bistatic transceiver.

The laser source 202 may be configured to provide the LO signal to the modulator 204B, which is configured to modulate a phase and/or a frequency of the LO signal based on a second RF signal (shown in FIG. 2 as, "RF2") and using Continuous Wave (CW) modulation or quasi-CW modulation to generate a modulated LO signal and send the modulated LO signal to the mixer 208 of the Rx path.

The mixer 208 may be configured to mix (e.g., combine, multiply, etc.) the modulated LO signal with the returned signal to generate a down-converted signal and send the down-converted signal to the detector 212. In some arrangements, the mixer 208 may be configured to send the modulated LO signal to the detector 212.

The detector 212 may be configured to generate an electrical signal based on the down-converted signal and send the electrical signal to the TIA 214. In some arrangements, the detector 212 may be configured to generate an electrical signal based on the down-converted signal and the modulated signal.

The TIA 214 may be configured to amplify the electrical signal and send the amplified electrical signal to the vehicle control system 120 via the one or more ADCs 220.

In some implementations, the TIA 214 may have a peak noise-equivalent power (NEP) that is less than 5 picowatts per square root Hertz (i.e., 5×10-12 Watts per square root Hertz). In some implementations, the TIA 214 may have a gain between 4 kiloohms and 25 kiloohms.

In some implementations, detector 212 and/or TIA 214 may have a 3 decibel bandwidth between 80 kilohertz (kHz) and 450 megahertz (MHz).

The vehicle control system 120 may be configured to determine a distance to the object 218 and/or measure the velocity of the object 218 based on the one or more electrical signals that it receives from the TIA via the one or more ADCs 220.

In some implementations, modulator 204A and/or modulator 204B may have a bandwidth between 400 megahertz (MHz) and 1000 megahertz (MHz).

In some implementations, the modulator 204A may be configured to send a first modulated light (optical) signal and a second modulated light (optical) signal to the amplifier 206. The amplifier 206 may be configured to amplify the first and second modulated light signals to generate amplified light signals to the optics 210 via the transmitters 216. The optics 210 may be configured to steer the first and second modulated light signals that it receives from the Tx path into an environment within a given field of view toward an object 218, may receive corresponding first and second returned signals reflected back from the object 218, and provide the first and second returned signals to the mixer 208 of the Rx path via the receivers 222. The modulator 204B may be configured to generate (1) a first modulated LO signal associated with the first modulated light signal and (2) a second modulated LO signal associated with the second modulated light signal and send the first and second modulated LO signals to the mixer 208 of the Rx path. The mixer 208 may be configured to pair (e.g., associate, link, identify, etc.) the first returned light signal and the first modulated LO signal, and mix (e.g., combine, multiply, etc.) the first returned light signal and the first modulated LO signal to generate a first down-converted signal and send the first down-converted signal to the detector 212. Similarly, the mixer 208 may be configured to pair the second returned light signal and the second modulated LO signal and mix the second returned light signal and the second modulated LO signal to generate a second down-converted signal and send the second down-converted signal to the detector 212. The detector 212 may be configured to generate first and second electrical signals based on the first and second down-converted signals, respectively. The vehicle control system 120 may be configured to determine a distance to the object 218 and/or measure the velocity of the object 218 based on the first and second electrical signals, received via TIA 214 and ADCs 220.

Figure 3:
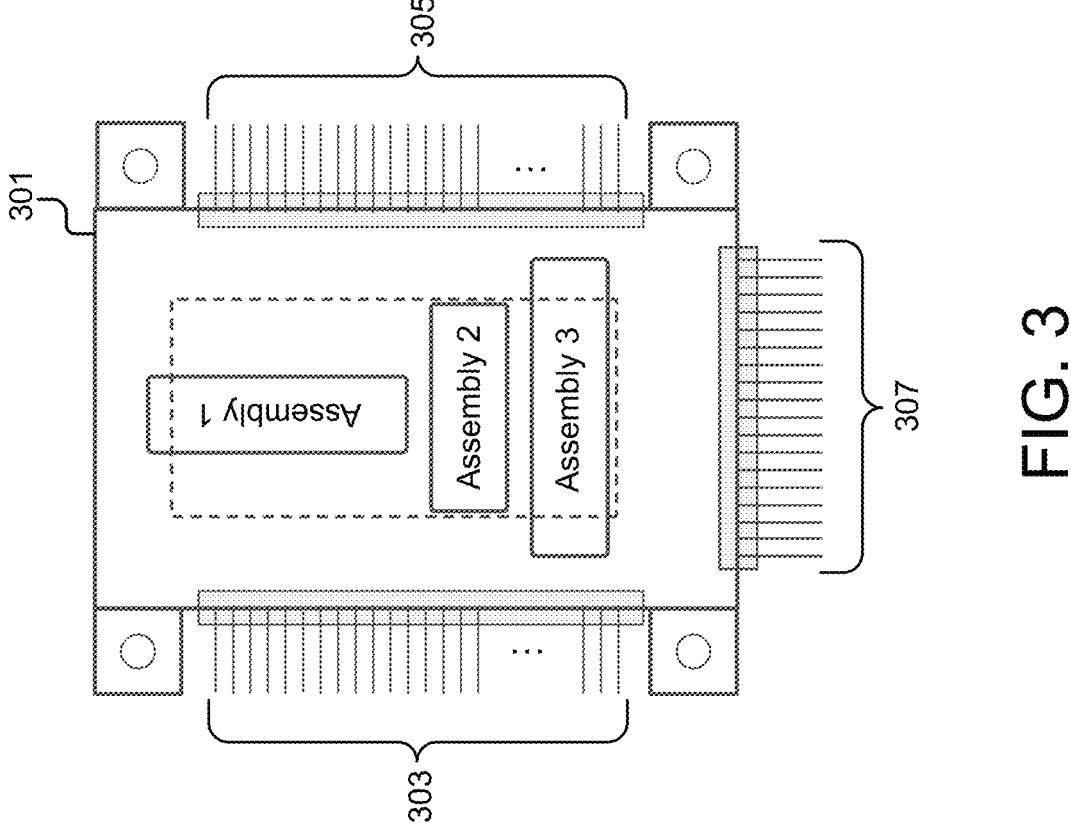
FIG. 3 is a high-level schematic diagram illustrating an example of an integrated chip packaging of a coherent LIDAR sensor for autonomous vehicles, according to some implementations.
Figure 3:
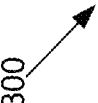

FIG. 3 is a high-level schematic diagram 300 illustrating an example of an integrated chip packaging 301 of a coherent LIDAR sensor for autonomous vehicles, according to some implementations. In some implementations, the integrated chip packaging 301 may be a "gold box" assembly—a metallic housing that hosts and integrates one or more of the optical components and electronic components. FIG. 3 depicts a top view of an example integrated chip packaging 301 enclosing a configuration of components, such as Assembly 1, Assembly 2, and Assembly 3. In one example, the Assembly 1 may be a laser seed assembly including a seed laser or light source (e.g., a distributed feedback (DFB) diode laser source), a modulator, an optical isolator, an optical amplifier, micro-lens, etc. In another example, the Assembly 2 may be an optical amplifier assembly including one or more arrays of semiconductor optical amplifiers (SOA), etc. In another example, the Assembly 3 may include an assembly of transceivers, an assembly of transimpedance amplifiers (TIA), etc. In one example implementation, the light or beam generated by the laser seed assembly may be coupled into the transceiver assembly via a lens assembly. The transceiver assembly may be configured to process the beam using the assembly of SOA arrays. For example, the transceiver assembly may be configured to amplify the beam as part of processing. Each SOA array may include four to five channels and is config-ured to amplify the beam through stimulated emission. The transceiver assembly processes the light collected off a reflection from a target and couples the detected photocur-rent to the TIA assembly. The TIA assembly converts the photocurrent into an electrical voltage which is then coupled out of the integrated chip packaging 301.

In FIG. 3, the integrated chip packaging 301 includes electrical feedthroughs 303, 305, and 307 that are wire bonded to the enclosed components within the integrated chip packaging 301 for connection to the outside world. For example, the electrical feedthroughs 303, 305, and 307 may carry radio frequency (RF) and direct current (DC) signals in and out of the integrated chip packaging 301. Each of the electrical feedthroughs 303, 305, and 307 are formed using a ceramic board that is hermetically sealed to the integrated chip packaging 301. In the example of FIG. 3, the electrical feedthrough 303 may be wire bonded to Assembly 1, the electrical feedthrough 305 may be wire bonded to Assembly 2, and the electrical feedthrough 307 may be wire bonded to Assembly 3. The integrated chip packaging 301 may be hermetically sealed to protect the enclosed components from environmental conditions (e.g., humidity, moisture, con-taminants, temperature, pressure, etc.) and extend their operational lifespan. A disadvantage of the integrated chip packaging 301 in FIG. 3 is that its design is a bottleneck for scaling up the number of transceivers in the LIDAR sensor system. This is because of the sheer number of pins or leads that may be needed on the electrical feedthroughs 303, 305 and 307 to support a high number of the RF receive channels when the number of transceivers is scaled up in the LIDAR sensor system, thereby increasing the size of the integrated chip packaging 301 as well. Another disadvantage of the integrated chip packaging 301 in FIG. 3 is a lack of protection against electromagnetic interference for the sig-nals coupled out of the feedthroughs 303, 305, and 307. For example, if the electrical feedthrough 307 is configured to couple RF signals out of the integrated chip packaging 301, the leads from the electrical feedthrough 307 may need to be soldered on to an active electronic component (e.g., FR4 RF board) outside the integrated chip packaging 301 for pro-cessing the output electrical signals. This configuration may expose the RF signals to electromagnetic interference out-side the integrated chip packaging 301.

Figure 4:
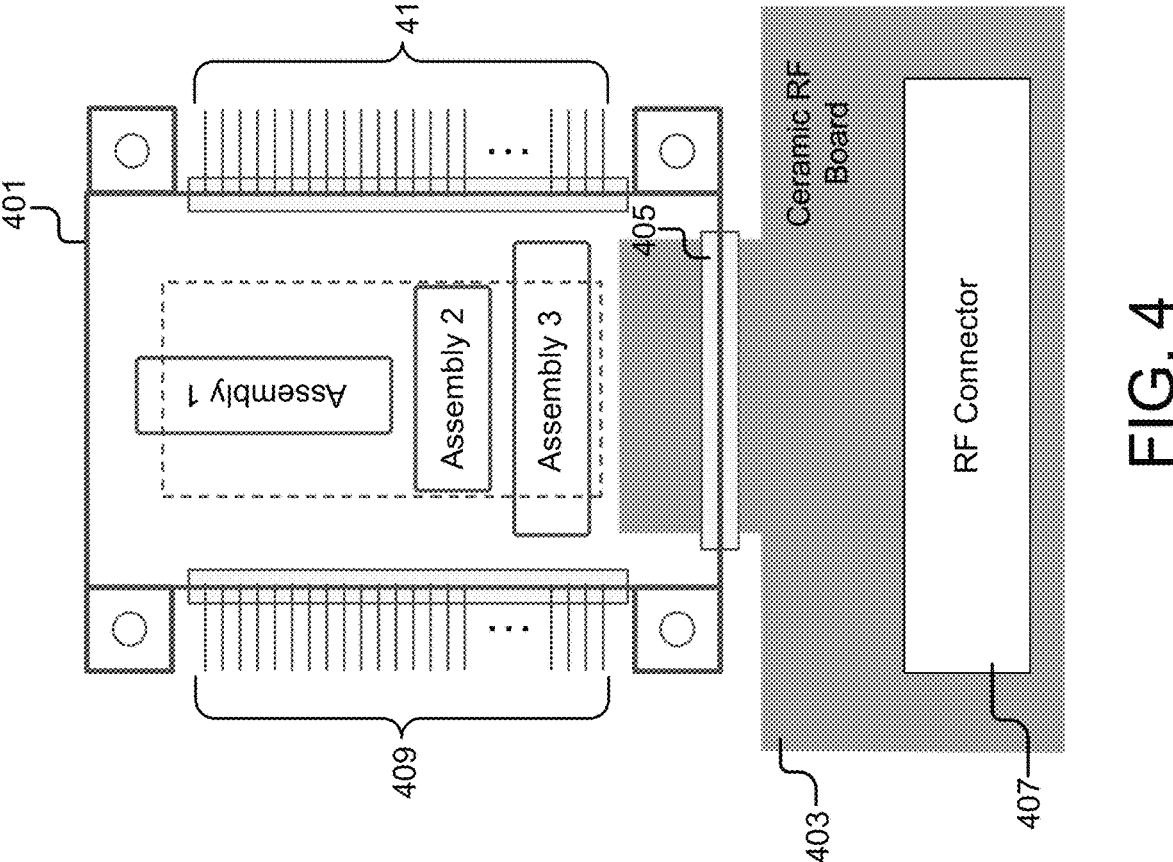
FIG. 4 is a high-level schematic diagram illustrating an example of a ceramic radio frequency (RF) circuit board that is hermetically sealed to an integrated chip packaging of a coherent LIDAR sensor for autonomous vehicles, according to some implementations.
Figure 4:
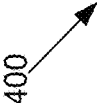

FIG. 4 is a high-level schematic diagram 400 illustrating an example of a ceramic radio frequency (RF) circuit board 403 that is hermetically sealed to an integrated chip pack-aging 401 of a coherent LIDAR sensor for autonomous vehicles, according to some implementations. As similarly described with reference to FIG. 3, the integrated chip packaging 401 may be a "gold box" assembly—a metallic housing that hosts and integrates one or more of the optical components and electronic components associated with a LIDAR sensor system. As similarly described with reference to FIG. 3, the integrated chip packaging 401 may be assembled with a configuration of components, such as Assembly 1, Assembly 2, and Assembly 3 on an internal circuit board (not shown). For example, a base material of the internal circuit board may include printed circuit board (PCB), ceramic, etc. In FIG. 4, the ceramic RF circuit board 403 may be a bespoke RF circuit board configured to primarily handle a plurality of RF signals separately from the internal circuit board. The internal circuit board may be configured to primarily handle a plurality of DC signals within the integrated chip packaging 401. In other words, the ceramic RF circuit board 403 may be a high-density RF circuit board that is decoupled in the manufacturing of the integrated chip packaging 401.

The ceramic RF circuit board 403 may include an RF connector 407. A portion of the ceramic RF circuit board 403 may span across the hermetic seal 405. Outside the inte-grated chip packaging 401, the ceramic RF circuit board effectively serves as an electrical feedthrough. The ceramic RF circuit board 403 is configured to be hermetically sealed to one side of the metallic housing, that is, the integrated chip packaging 401. One existing approach for hermetically sealing a ceramic component to the integrated chip packag-ing 401 is through brazing. For example, the ceramic material forming the electrical feedthroughs 409 and 411 are hermetically sealed to the integrated chip packaging 401 through brazing. However, brazing is a high-temperature (e.g., 600 degree Celsius) process that uses a filler material (e.g., a copper-silver alloy or a gold-copper alloy) to her-metically seal interfaces, such as a metal-to-metal interface, a metal-to-ceramic interface, etc. in the integrated chip packaging 401. A disadvantage of using this approach for hermetically sealing the ceramic RF circuit board 403 to the integrated chip packaging 401 is that a placement and/or interconnection of the components on the ceramic RF circuit board 403 can only occur after the brazing process is completed. This is because the high temperature needed for the brazing process may lead to warpage of the integrated chip packaging 401 and/or the components embedded on the ceramic RF circuit board 403, deform the pitch of the leads or pins of the electrical feedthroughs in the integrated chip packaging 401, etc. Additionally, there may be difficulties associated with placing and interconnecting the components on the ceramic RF circuit board 403 even after brazing is completed. For example, there may be space constraints where the walls of the integrated chip packaging 401 may hinder a fabrication technique, such as screen printing onto the surface of the ceramic RF circuit board 403 after it has been brazed to the integrated chip packaging 401. In another example, the area of the ceramic RF circuit board 403 available for embedding RF components may be reduced after it has been brazed to the integrated chip packaging 401. This is because one side (e.g., bottom) of the ceramic RF circuit board 403 may become inaccessible for assembling components after the ceramic RF circuit board 403 has been put face down and brazed to the integrated chip packaging 401.

To address the above-described shortcomings caused by the use of brazing process, the present disclosure describes a low temperature technique for hermetically sealing the ceramic RF circuit board to an integrated chip packaging.

As will be described further below in FIGS. 5A-5B, the ceramic RF circuit board 403 may include a flange that is bonded to one side of the metallic housing using silver sintering approach. An advantage of using silver sintering approach for sealing the ceramic RF circuit board 403 to the metallic housing is that the ceramic RF circuit board 403 may be configured and assembled with components (e.g., on both sides) separately before being bonded to the metallic housing in the manufacturing process. This is because the sintering process in silver sintering, when compared to the brazing process, occurs at a lower temperature (e.g., in a range from 120 to 300 degree Celsius) which the compo-nents on the ceramic RF circuit board 403 can safely tolerate. The decoupling of the ceramic RF circuit board 403 from the integrated chip packaging 401 during the manu-facturing of the integrated chip packaging 401 improves the manufacturing yield and throughput. Additionally, it circum-vents the issues associated with scaling the number of transceivers in the LIDAR sensor system. If a standard electrical feedthrough were implemented for carrying RF signals and brazed to the integrated chip packaging 401, the ceramic RF circuit board 403 may need to be split into two—an internal ceramic board within the integrated chip packaging 401 separated from an external ceramic board outside the integrated chip packaging 401 by the standard electrical feedthrough. This configuration is not ideal because of multiple ceramic components requiring wire bonding and further raises issues associated with impedance matching, noise shielding, space constraints, etc. that degrade performance. In contrast to a standard electrical feedthrough for RF signals, the ceramic RF circuit board 403 allows for embedding of narrow traces which supports a high input/output (I/O) coherent LIDAR sensor in a reduced footprint of the integrated chip packaging 401. The bonding of the flange included in the ceramic RF circuit board 403 to the integrated chip packaging 401 provides the hermetic seal that is crucial for the operation of the integrated optical and electronic components. For example, the RF signals within the ceramic RF circuit board 403 are protected from electromagnetic interface by the hermetic seal as they pass through to the processing board.

Figures 5A, 5B:
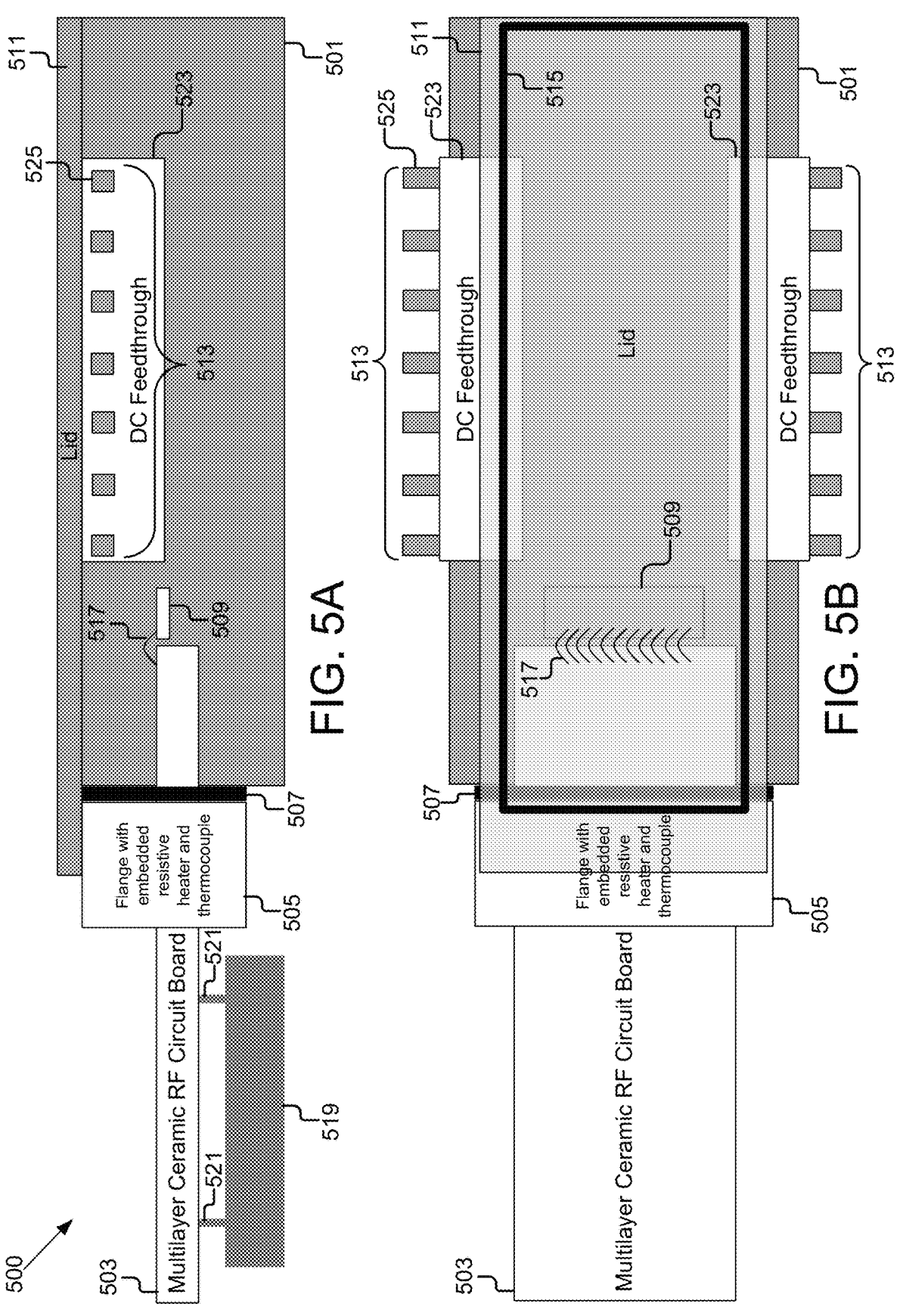
FIGS. 5A-5B are detailed schematic diagrams illustrating an example method of sealing a ceramic RF circuit board to an integrated chip packaging of a coherent LIDAR sensor for autonomous vehicles, according to some implementations.

FIGS. 5A-5B are detailed schematic diagrams illustrating an example method 500 of hermetically sealing a ceramic RF circuit board 503 to an integrated chip packaging 501 of a coherent LIDAR sensor for autonomous vehicles, according to some implementations. FIG. 5A is a cross-sectional diagram illustrating the example method 500 of hermetically sealing the ceramic RF circuit board 503 to the integrated chip packaging 501 of a coherent LIDAR sensor. FIG. 5B is a top view diagram illustrating the example method 500 of hermetically sealing the ceramic RF circuit board 503 to the integrated chip packaging 501 of a coherent LIDAR sensor.

In some implementations, the integrated chip packaging 501 may be made from a composite assembly of one or more of kovar, copper, tungsten, and ceramic material. For example, the substrate base of the integrated chip packaging 501 may be made of copper-tungsten (Cu—W) material. In another example, the DC feedthrough 513 of the integrated chip packaging 501 may be made of ceramic material. In another example, the frame or body and the lid 511 of the integrated chip packaging 501 may be made of kovar or an alloy of iron (Fe), nickel (Ni), and cobalt (Co). In some implementations, the metallic housing, that is, the integrated chip packaging 501 may include a cutout of an appropriate shape on one of its sides. In the example of FIGS. 5A & 5B, the cutout may be a rectangular cutout made on the left side of the metallic housing. In some implementations, the interior of the integrated chip packaging 501 may include a circuit board (not shown) that is assembled with one or more of optical components and electronic components associated with the coherent LIDAR sensor for autonomous vehicles. For example, the circuit board within the metallic housing may be assembled with a laser seed assembly, an optical amplifier assembly, a transceiver assembly, a lens array, a heat transfer component, etc. For the sake of simplicity, FIGS. 5A and 5B depict an example block of transceivers 509 assembled on the circuit board (not shown) within the metallic housing.

In some implementations, the metallic housing may include a configuration of DC feedthrough 513 coupled to a side of the metallic housing. In the example of FIGS. 5A & 5B, the pair of DC feedthroughs 513 may be coupled on opposite sides of the metallic housing. A set of leads 525 are formed in the ceramic material of the DC feedthroughs 513 for coupling signals in and out of the integrated chip packaging 501. In one example, the set of leads 525 may be made of an alloy of iron (Fe), nickel (Ni), and cobalt (Co). The DC feedthrough 513 on each side of the metallic housing may be configured to primarily couple DC signals. For example, there may be a set of 40 leads taken out of the DC feedthrough 513 on each side of the metallic housing. In this example, among the 40 leads, a particular number of the leads may couple RF signals. The number of the leads can be any number of channels dedicated to RF signals and/or DC. In some implementations, the number can be determined based on the number of lidar beams. The optical and electronic components assembled on the circuit board within the metallic housing may be appropriately wire bonded to the DC feedthroughs 513 on each side.

In some implementations, the ceramic RF circuit board 503 may be a multilayer board. The ceramic RF circuit board 503 may include a flange 505. The flange 505 may include a resistive heater and a thermocouple embedded therein. A portion of the ceramic RF circuit board 503 may extend on either side of the flange 505. A shape of the flange 505 in the ceramic RF circuit board 503 may match the shape of the cutout made in the side of the metallic housing. In some implementations, the ceramic RF circuit board 503 may be a specialized circuit board that is designed to handle RF signals within the LIDAR sensor system. In contrast to a standard electrical feedthrough for handling RF signals, the ceramic RF circuit board 503 is a high-density board. For example, the number of RF signals handled by the ceramic RF circuit board 503 may be in an approximate range of 5 to 500 RF signals. A reason for this is because when leads are attached to the ceramic material of the standard electrical feedthrough, there is a minimum pitch requirement that needs to be satisfied because the ceramic and the leads each have a different coefficient of thermal expansion. The ceramic material of the standard electrical feedthrough may be embedded with dense traces but when they get broken out into leads, the size of the ceramic may need to be expanded which ends up increasing the size of the integrated chip packaging. On the other hand, the ceramic RF circuit board 503 circumvents the problems with the leads by being a single piece that is hermetically sealed to the integrated chip packaging 501.

The ceramic RF circuit board 503 may be responsible for various functions, such as receiving and processing reflected RF signals from a target object, performing RF filtering and signal conditioning for optimal performance of the LIDAR sensor system, etc. The ceramic RF circuit board 503 may be configured and assembled with RF components, such as RF amplifiers, filters, connectors, and other active and passive components (e.g., capacitor bank) designed to operate at specific RF frequencies, which are typically in the microwave or millimeter-wave frequency bands. These RF components may be precisely tuned and arranged on the ceramic RF circuit board 503 to ensure proper RF signal propagation, impedance matching, and minimal signal loss. In some implementations, one or more application specific integrated circuits (ASICs) may be included in the ceramic RF circuit board 503. The ceramic RF circuit board 503 may also be assembled with a transimpedance amplifier (TIA) bank using flip-chip bonding. For example, the portion of the ceramic RF circuit board 503 to the right of the flange 505 may be assembled with the TIA bank. In some implementations, the ceramic RF circuit board 503 may be provisioned with a supporting structure 519 to minimize shock and vibration. For example, the portion of the ceramic RF circuit board 503 to the left of the flange 505 may be mounted onto the supporting structure 519 having a base with the help of standoffs 521. The standoffs 521 may be positioned on four corners under the ceramic RF circuit board 503 and above the supporting structure 519.

In the next step of the manufacturing process, a fully assembled ceramic RF circuit board 503 may be coupled to the side of the metallic housing including a fully assembled circuit board as described above. In the example method 500 of FIGS. 5A and 5B, the flange 505 of the ceramic RF circuit board 503 may be coupled to the cutout on the side of the metallic housing. In some implementations, a jig may be used to insert the portion of the ceramic RF circuit 503 to the right of the flange 505 into the cutout on the side of the metallic housing and align the flange 505 of the ceramic RF board 503 against the cutout on the side of the metallic housing. Furthermore, the bond pads between the ceramic RF circuit board 503 and the circuit board within the metallic housing are also aligned. The bond pads between the ceramic RF circuit board 503 and the circuit board within the metallic housing are then wire bonded using a wire bonding material to make an interconnection 517. For example, the transceiver assembly 509 on the circuit board within the metallic housing is wire bonded to the TIA bank assembled on the portion of the ceramic RF circuit 503 to the right of the flange 505.

After the flange 505 of the ceramic RF circuit board 503 is coupled to the cutout on the side of the metallic housing, a sealing material 507 is applied to an interface between the flange 505 of the ceramic RF circuit board 503 and the cutout on the side of the metallic housing. The sealing material may be in paste or ink form for easy dispensing. In some implementations, the sealing material 507 may be dispensed onto the surface of the flange 505 before it is coupled to the cut out on the side of the metallic housing. The jig may then be used to couple the surface of the flange 505 to the cut out on the side of the metallic housing and apply pressure to ensure contact is made at the interface between the flange 505 of the ceramic RF circuit board 503 and the cutout on the side of the metallic housing. In one example, the sealing material 507 may be a silver sinter. In another example, the sealing material 507 may be solder. Prior to sealing the flange 505 of the ceramic RF circuit board 503 to the cutout on the side of the metallic housing, a lid 511 is coupled to an open side of the metallic housing. In the example method 500 of FIGS. 5A and 5B, the lid 511 is placed on top of the metallic housing to cover the open side of the metallic housing along the seam 515. One side (e.g., left side) of the lid 511 overlaps the flange 505 of the ceramic RF circuit board 503 such that the lid 511 is also contacts with the sealing material 507 applied to the interface between the flange 505 of the ceramic RF circuit board 503 and the cutout on the side of the metallic housing.

In the example method 500 of FIGS. 5A and 5B, the last step of the manufacturing process includes locally heating the flange 505 of the ceramic RF circuit board 503 to bond the flange 505 to the cutout on the side of the metallic housing. As described earlier, the flange 505 may include an embedding of a resistive heater and a thermocouple. The flange 505 of the ceramic RF circuit board 503 is locally heated using the resistive heater. The resistive heater raises the temperature of the flange 505 to sinter or heat the sealing material and form a solid bond between the flange 505 and the cutout on the side of the metallic housing. For example, the temperature may be raised to 200 degree Celsius to sinter the silver particles in the silver sinter and produce a solid bond. The heating of the flange 505 is controlled using the thermocouple. The thermocouple measures the temperature of the flange 505 as the resistive heater raises the temperature. Once the temperature reaches the threshold (e.g., for sintering) as measured by the thermocouple, the resistive heater is configured to stop heating the flange 505. The bonding of the flange 505 to the cutout on the side of the metallic housing forms a hermetic seal at the interface. Additionally, the localized heating of the flange 505 of the ceramic RF circuit board 503 also bonds the lid 511 to the metallic housing and the flange 505 of the ceramic RF circuit board 503. In the example method 500 of FIGS. 5A and 5B, the flange 505 provides the seam 515 for the lid bonding on the left side. Another example method of localized heating of the flange 505 is through induction heating.

It should be understood that in some implementations, the ceramic RF circuit board 503 can be modified so that a ceramic board replaces all feed throughs on all 4 sides.

The schematic as described above is part of the design for an integrated circuit chip. The chip design is created in a graphical computer programming language and stored in a computer readable storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the computer readable storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The foregoing detailed description of the present disclosure has been presented for purposes of illustration and description. It is not intended to be exhaustive or to limit the present disclosure to the precise form disclosed. Many modifications and variations are possible in light of the above teachings. The described implementations were chosen in order to best explain the principles of the present disclosure and its practical application, to thereby enable others skilled in the art to best utilize the present disclosure in various implementations and with various modifications as are suited to the particular use contemplated. It is intended that the scope of the present disclosure be defined by the claims appended hereto.

Although some implementations of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present disclosure is not intended to be limited to the particular implementations of the process, machine, fabrication, composition of matter, means, methods, and steps described in the specification. As one of ordinary skill in the art will readily appreciate from the description of the present disclosure, processes, machines, fabrication, compositions of matter, means, methods, or steps, presently existing or later to be developed, that perform substantially the same function or achieve substantially the same result as the corresponding implementations described herein may be utilized according to the present disclosure. Accordingly, the appended claims are intended to include within their scope such processes, machines, fabrication, compositions of matter, means, methods, or steps.

What is claimed is:

1. A method for manufacturing an integrated chip packaging for a light detection and ranging (LIDAR) sensor mounted to a vehicle, the method comprising:
   obtaining a metallic housing including a cutout on a side of the metallic housing;
   obtaining a ceramic radio frequency (RF) circuit board including a flange;
   mounting a base of the ceramic RF circuit board situated to a side of the flange onto a supporting structure using a plurality of standoffs;
   coupling the flange of the ceramic RF circuit board to the cutout on the side of the metallic housing;
   applying a sealing material to an interface between the flange of the ceramic RF circuit board and the cutout on the side of the metallic housing; and
   locally heating the flange of the ceramic RF circuit board to bond the flange of the ceramic RF circuit board to the cutout on the side of the metallic housing thereby forming a seal at the interface.

2. The method of claim 1, wherein the seal at the interface is a hermetic seal.

3. The method of claim 2, wherein the hermetic seal shields RF signals on the ceramic RF circuit board within the metallic housing from electromagnetic interference.

4. The method of claim 1, wherein coupling the flange of the ceramic RF circuit board to the cutout on the side of the metallic housing comprises:
   inserting the ceramic RF circuit board into the cutout on the side of the metallic housing; and
   aligning the flange of the ceramic RF circuit board against the cutout on the side of the metallic housing.

5. The method of claim 4, wherein aligning the flange of the ceramic RF circuit board against the cutout on the side of the metallic housing comprises:
   aligning bond pads between the ceramic RF circuit board and a direct current (DC) circuit board within the metallic housing; and
   wire bonding the bond pads for making an interconnection.

6. The method of claim 5, wherein the interconnection includes one between a transimpedance amplifier (TIA) bank on the ceramic RF circuit board and a transceiver assembly on the DC circuit board within the metallic housing.

7. The method of claim 4, wherein applying the sealing material to the interface between the flange of the ceramic RF circuit board and the cutout on the side of the metallic housing comprises:
   dispensing the sealing material onto a surface of the flange of the ceramic RF circuit board prior to the coupling; and
   applying pressure to ensure contact is made at the interface between the flange of the ceramic RF circuit board and the cutout on the side of the metallic housing.

8. The method of claim 1, further comprising:
   prior to locally heating the flange of the ceramic RF circuit board, coupling a lid to the metallic housing.

9. The method of claim 8, wherein the lid covers an open side of the metallic housing, and a side of the lid overlaps the flange of the ceramic RF circuit board such that the lid contacts the sealing material.

10. The method of claim 9, wherein locally heating the flange of the ceramic RF circuit board bonds the lid to the metallic housing and the flange of the ceramic RF circuit board.

11. The method of claim 1, wherein the flange of the ceramic RF circuit board includes an embedding of a resistive heater and a thermocouple.

12. The method of claim 11, wherein locally heating the flange of the ceramic RF circuit board to bond the flange of the ceramic RF circuit board to the cutout on the side of the metallic housing comprises:
   raising, using the resistive heater, a temperature of the flange to sinter the sealing material; and
   measuring, using the thermocouple, the temperature of the flange as the resistive heater raises the temperature to reach a threshold temperature associated with sintering.

13. The method of claim 12, wherein the temperature of the flange is raised to a point anywhere in a range from 200 to 250 degree Celsius.

14. The method of claim 1, wherein the ceramic RF circuit board is assembled with one or more of an RF connector, a transimpedance amplifier (TIA) bank, RF amplifiers, and RF filters.

15. The method of claim 5, wherein the DC circuit board within the metallic housing is assembled with one or more of a seed laser assembly, an optical amplifier assembly, a transceiver assembly, a lens array, and a heat transfer component.

16. The method of claim 1, wherein the sealing material comprises at least one of silver sinter or solder.

17. The method of claim 1, wherein the ceramic RF circuit board is a multilayer ceramic RF circuit board.

18. An integrated chip packaging for a light detection and ranging (LIDAR) sensor manufactured by a process comprising:
   obtaining a metallic housing including a cutout on a side of the metallic housing;
   obtaining a ceramic radio frequency (RF) circuit board including a flange;
   mounting a base of the ceramic RF circuit board situated to a side of the flange onto a supporting structure using a plurality of standoffs;
   coupling the flange of the ceramic RF circuit board to the cutout on the side of the metallic housing;
   applying a sealing material to an interface between the flange of the ceramic RF circuit board and the cutout on the side of the metallic housing; and
   locally heating the flange of the ceramic RF circuit board to bond the flange of the ceramic RF circuit board to the cutout on the side of the metallic housing thereby forming a seal at the interface.

19. A light detection and ranging (LIDAR) sensor system comprising:
   an integrated chip packaging for a LIDAR sensor, the integrated chip packaging manufactured by a process including:
   obtaining a metallic housing including a cutout on a side of the metallic housing;
   obtaining a ceramic radio frequency (RF) circuit board including a flange;
   mounting a base of the ceramic RF circuit board situated to a side of the flange onto a supporting structure using a plurality of standoffs;
   coupling the flange of the ceramic RF circuit board to the cutout on the side of the metallic housing;

applying a sealing material to an interface between the flange of the ceramic RF circuit board and the cutout on the side of the metallic housing; and locally heating the flange of the ceramic RF circuit board to bond the flange of the ceramic RF circuit board to the cutout on the side of the metallic housing thereby forming a seal at the interface.

5

\* \* \* \* \*